Figure 1:
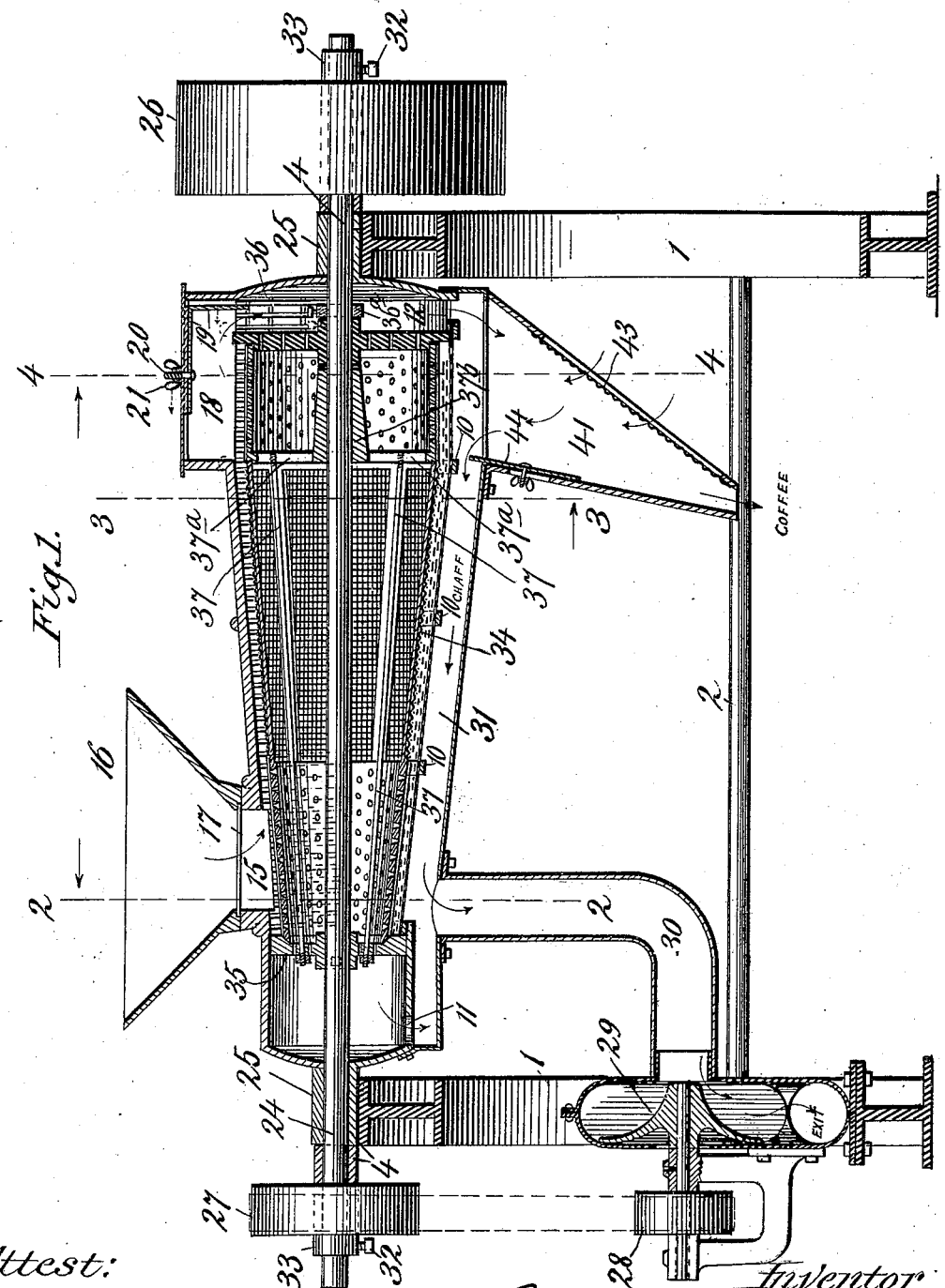

(No Model.) 3 Sheets—Sheet 1.

C. A. HEGE.
MACHINE FOR HULLING COFFEE, &c.

No. 548,054. Patented Oct. 15, 1895.

Attest:
F. H. Schott
Alfred T. Gage

Inventor
Constantine A. Hege,
by W. C. Kindermann
Atty (No Model.) 3 Sheets—Sheet 2.

C. A. HEGE.
MACHINE FOR HULLING COFFEE, &c.

No. 548,054. Patented Oct. 15, 1895.

Attest:
F. H. Schott
Alfred T. Gage

Inventor:
Constantine A. Hege
by W. H. Henderson
Atty.

(No Model.) 3 Sheets—Sheet 3.

C. A. HEGE.
MACHINE FOR HULLING COFFEE, &c.

No. 548,054. Patented Oct. 15, 1895.

Attest:
F. H. Schott
Alfred T. Gage

Inventor:
Constantine A. Hege,
by W. D. Henderson,
atty.

UNITED STATES PATENT OFFICE.

CONSTANTINE A. HEGE, OF SALEM, NORTH CAROLINA, ASSIGNOR TO C. A. HEGE & CO., OF SAME PLACE.

MACHINE FOR HULLING COFFEE, &c.

SPECIFICATION forming part of Letters Patent No. 548,054, dated October 15, 1895.

Application filed December 6, 1893. Serial No. 492,901. (No model.)

*To all whom it may concern:*

Be it known that I, CONSTANTINE A. HEGE, a citizen of the United States, residing at Salem, in the county of Forsyth and State of North Carolina, have invented certain new and useful Improvements in Machines for Hulling Coffee and other Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for hulling coffee and separating the hulls and other foreign matter therefrom after the coffee has been hulled.

While the machine is particularly adapted to hulling the coffee and separating the foreign matter therefrom, still it is not confined in its use thereto, as it can be used for decorticating rice and other cereals or grain to which the machine may be adapted. In the description, however, I shall treat only of the hulling and cleaning of the coffee, as that will be sufficient for an illustration of the construction and operation of the machine.

The invention has for its object the simplification, but more particularly an increase in the efficiency of the machine, both for the hulling of the coffee and the subsequent separation of the hulls and other particles of the covering to the berry and the removal of these foreign matters from the machine; and it has further for its object to provide for reducing to the minimum the heat generated by the machine while in operation, so that the coffee-bean will be protected against the bad effects of the heat usually generated in the operation of coffee-hulling machines, which undue heat has a tendency to draw the oil of the coffee-berry to the surface and to discolor the coffee, which discoloration it is desirable to avoid.

To the accomplishment of the foregoing and such other objects as may hereinafter appear the invention consists in the construction as well as in the combination of parts hereinafter particularly described and then sought to be clearly defined by the claims, reference being had to the accompanying drawings, forming a part hereof, in which—

Figure 4:
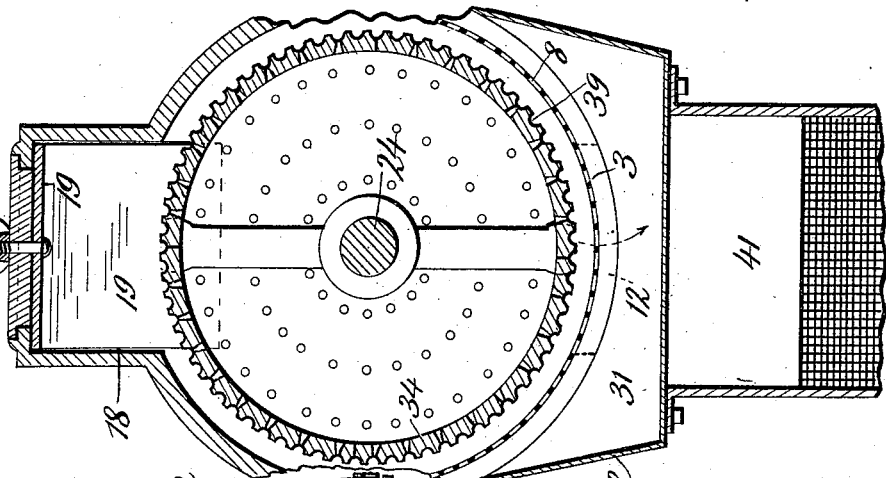
Figure 3:
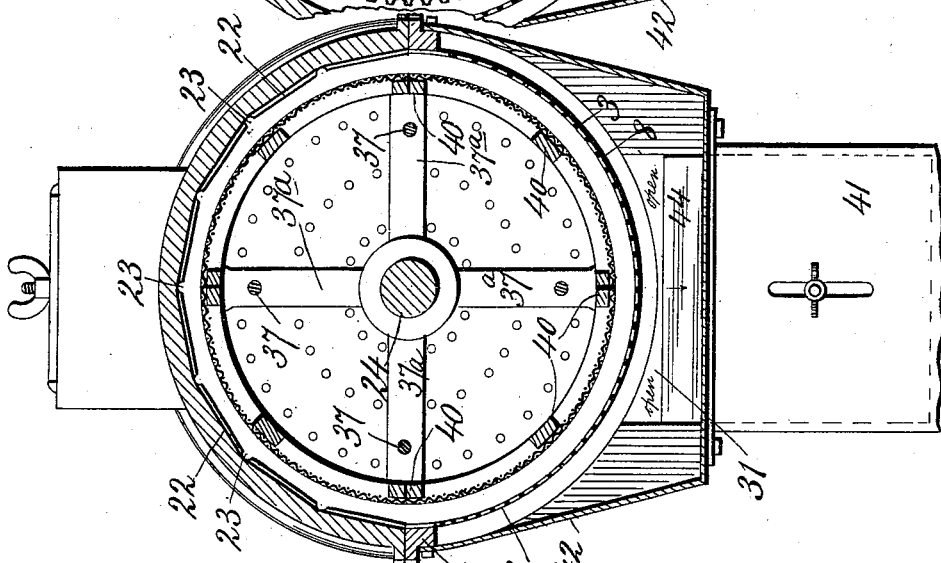
Figure 2:
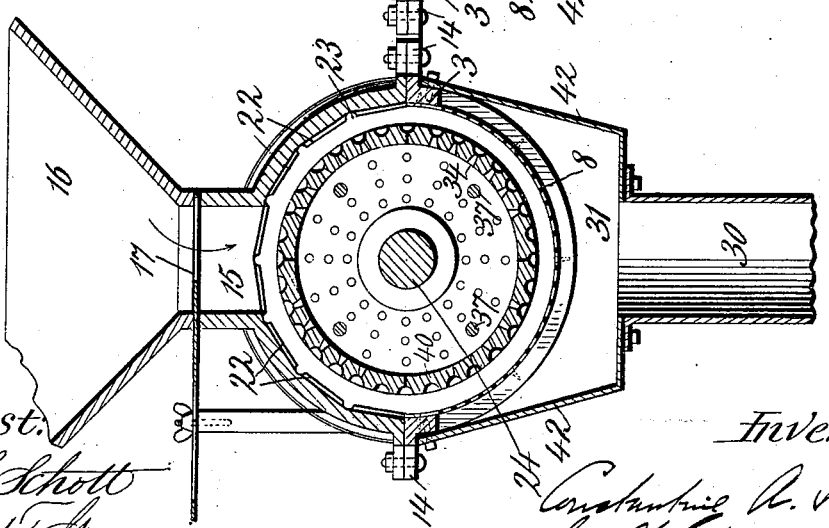
Figure 6:
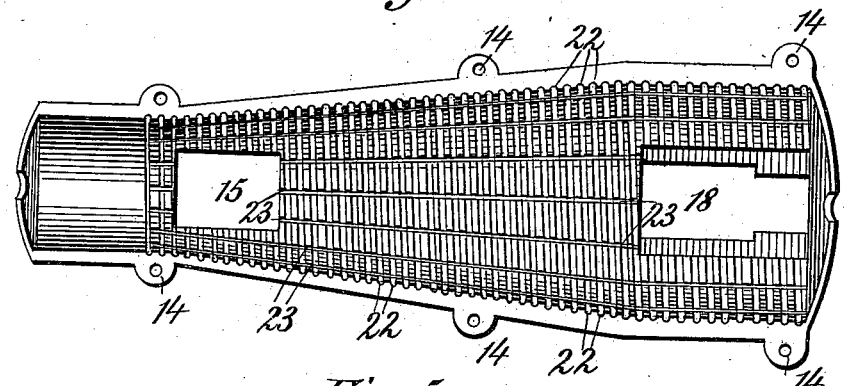
Figure 5:
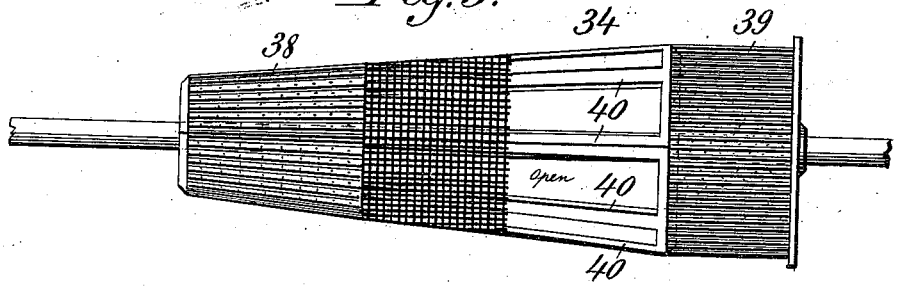
Figure 7:
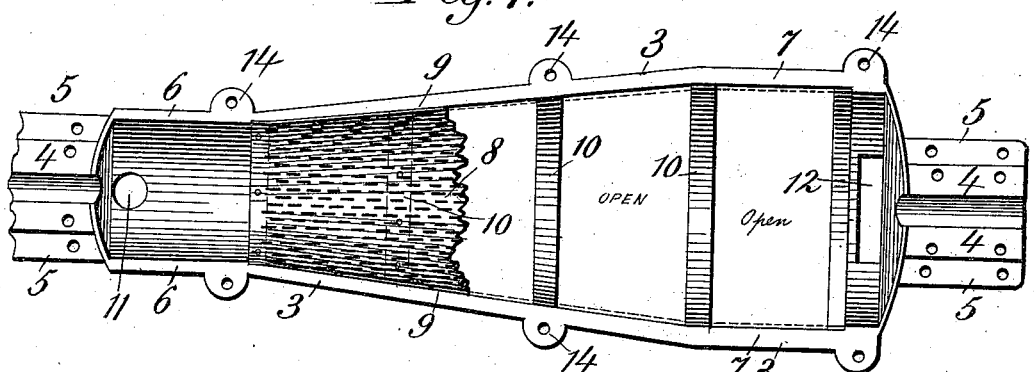
Figures 8, 9:
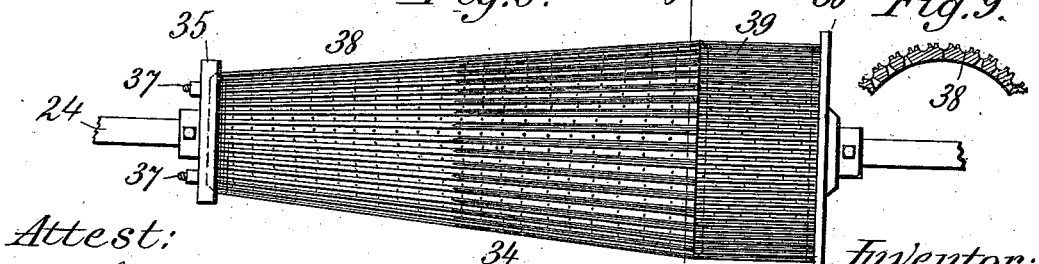

Figure 1 is a vertical longitudinal section through the machine with some of the parts in full lines. Fig. 2 is a cross-section on the line $2^\times 2^\times$ of Fig. 1. Fig. 3 is a cross-section on the line $3^\times 3^\times$ of Fig. 1; Fig. 4, a cross-section on the line $4^\times 4^\times$ of Fig. 1; Fig. 5, a side view of one form of the cone or body, which revolves inside of the shell of the machine, a part of the wire which constitutes a portion of the surface of the body being left off. Fig. 6 is a bottom plan view of the upper portion or half of the inclosing-shell; Fig. 7, a plan view of the lower portion or half of the inclosing-shell, a part of the bottom of the same being broken away or omitted; Fig. 8, a side view of another form of the cone or body, which revolves in the shell; and Fig. 9, a cross-section on the line $8^\times 8^\times$ of Fig. 8, showing a portion of the cone or body.

In the drawings, the numeral 1 designates the two end standards of the machine-frame connected together by rods 2.

The lower half 3 of the shell of the machine is provided at opposite ends with the segmental journal-boxes 4, which rest upon the upper end of the standards 1 and are provided with flanges 5, by means of which and bolts and nuts the lower half of the shell will be secured to said flanges. The portion of the shell between the journal-boxes is semicircular, with the central portion tapering longitudinally, with a cylindrical portion 6 at one end and a cylindrical portion 7 at the other end of the tapering portion, with the sides and bottom in the preferred form composed of perforated metal 8, fitted into a recess formed in the cast-metal sides 9, and secured in place by countersunk screws entering the cast-metal portion of the shell, which perforated metal portion may be strengthened and supported by external ribs 10, extending transversely of the semicircular body. It is preferred to have this cylindrical portion extend from the inner end of the perforated portion 6 to the outer end, or substantially so, of the cylindrical portion 7. The cylindrical portion 6 is preferably formed with an aperture 11 for the outlet of air that may be drawn through the head of the revoluble body, and an opening 12 is formed in the bottom of the other end of the shell adjacent to its head for the passage of the hulls and cleaned coffee to a discharge-spout, hereinafter described. The upper half of the shell, as illustrated in Fig. 6 of the drawings, corresponds in form to the lower half, and the two halves are bolted together by bolts passing through ears 14, projecting from the meeting sides of the two halves of the shell. The upper half of the shell is provided in its top at the receiving end with an opening 15, above which is fitted the feed-hopper 16, controlled by a slide-valve 17, and at its discharge end is formed in its top with an opening 18 for a valve 19, which will control the flow of the coffee and its separated hulls and other foreign matter from the space between the shell and the revolving body therein into the space between the end of said revolving body and the end of the shell, as will be hereinafter more particularly set forth. This valve will be held to its adjustment by the bolt 20 and thumb-nut 21. The inner face of the upper half of the shell along its tapering portion, and, if desired, along its cylindrical portion at the discharge end, is made polygonal and a series of spirally-arranged grooves 22 extend from one end to the other of the tapering portion, and, if desired, along its cylindrical portion at the discharge end, and are so arranged that they will tend to feed the material from the receiving end toward the discharge end of the shell and the angles of the polygonal face assist in turning the berries over and over in their travel from one end to the other of the shell. For the purpose of further retarding the travel of the berries through the shell, so that they may be subjected for a longer period to the scouring action of the machine, I form longitudinally-extending grooves 23 in the face of the shell, said grooves, preferably, being formed along the angles of the polygonal face, and this constitutes one feature of the present invention. This shell differs from other constructions of shell in coffee-hulling machines in having the upper half of the shell formed on its inside face with the grooves extending longitudinally of the polygonal and spirally-grooved surface; also, in having the upper portion of the inner face of the shell polygonal in form with spiral and longitudinally-extending grooves, while the lower portion is a plain surface formed with perforations or apertures, and, further, in having a portion of the inner rubbing-surface tapering, while the other portion is cylindrical, or substantially so. The upper grooved surface affords an extended rubbing-surface for taking off the hulls and other particles to be removed from the berries, while the perforated bottom portion allows some of the chaff to work through the same, and also permits air to be drawn through the perforations to assist in keeping the coffee from becoming heated while being cleaned, thus keeping the coffee-berries quite cool while undergoing the necessary friction to effectually hull and clean the berry. By having a portion of the shell tapering and another portion at the discharge end cylindrical, I am enabled to employ a correspondingly-shaped revolving body inside the shell, whereby I obtain a better rubbing action and a more thorough separation of the hulls and foreign matter from the coffee-berry than otherwise.

The numeral 24 designates the shaft which sustains the revolving body inside the shell, and it has its bearings in the boxes 4 and the caps 25 to said boxes, which caps will be held in place by bolts that will pass through flanges to the caps and into the boxes 4. This shaft will carry at one end the drive-pulley 26 and at the other end a pulley 27, from which power will be transmitted by a belt to a pulley 28 on the shaft of a fan 29, located beneath the shell and which will have communication through a pipe 30 with a suction-chamber 31, hereinafter more particularly described. By loosening set-screws 32 of the collars 33 of the two pulleys 26 and 27, the shaft 24 can be adjusted longitudinally, so as to shift the revolving body inside the conical portion of the shell for the purpose of varying the space between the revolving body and the shell, and thus regulate the scouring action of the shell and revolving body on the coffee-berry, as will be apparent.

The revolving body inside the shell is designated by the numeral 34 and is made tapering for about two-thirds of its length, more or less, and cylindrical for the remaining portion at both the feed and discharge ends of the machine, as illustrated in Figs. 5 and 8 of the drawings. This body is preferably hollow and made up in whole or in part of a series of staves 40 and provided at opposite ends with rings or heads 35 and 36. These heads or rings project at both ends beyond the periphery of the revolving body, one head 35 bearing against the inside of the cylindrical portion 6 of the shell and the other head 36 bearing against the inside of the cylindrical portion 7 of the shell, as illustrated in Fig. 1 of the drawings, so as to prevent the escape of the coffee and other material over the end of the revolving body except as it is permitted by adjustment of the regulating-valve 19 at the discharge end of the machine.

The staves 40 may terminate at the beginning of the cylindrical portion of the hollow body, and in that event the cylindrical portion may be made in one piece, cylindrical in form, as illustrated, and next to the conical portion may have arms 37$^a$, extending from its sleeve 37$^b$, which encircles the shaft 24, through which arms and the head 35 tie-bolts 37 will pass, so as to bind the parts together. It is preferred to bevel the ends of the staves, so that they will fit into corresponding beveled recesses or grooves in the head 35 and the inner end of the cylindrical portion of the body, as illustrated, so as to bind the parts more tightly together. The head 36 may be held rigidly to the shaft 24, so as to turn therewith by means of a setto which they have been adjusted and the action of the machine is then continuous. The valve to the feed-hopper should be adjusted so as to let the coffee into the machine just fast enough to prevent the speed of the machine from checking, and the discharge-valve should be adjusted so as to let the coffee pass from the machine as fast as it is properly hulled. If the feed of the machine is too fast, the machine will run hard, and if the discharge is too free the coffee will not be well cleaned. Both valves, however, can be adjusted so as to obtain the proper feed and the proper discharge. The suction through the exhaust-chamber is regulated by the valve provided for the purpose, so that it will be just strong enough to remove the chaff, dirt, and other foreign substances and yet not to draw the coffee through the exhaust-chamber. The space between the revolving body and the inclosing-shell is regulated by adjustment of the revolving body, as previously stated. If any of the coffee should be broken as it is acted on by the machine, it is the result of the space between the revolving body and shell being too shallow, and in that event the revolving body is moved lengthwise, so as to increase the space. If the coffee is passed through or imperfectly hulled, it will probably be the result of the space between the revolving body and shell being too deep, and in that event the revolving body will be moved lengthwise to narrow the space, so as to get the results desired. If the machine should become clogged from any cause, cut off the feed of the material and open the discharge-valve, so as to allow all the material to run freely from the machine, and then close the discharge-valve and open the feed-valve for the gradual feed of the material to the machine. If in first starting up the machine any of the coffee should pass from the machine without being satisfactorily cleaned, return the coffee to the machine and let it pass through again; but after the parts are once adjusted the machine will be found to work satisfactorily and to discharge the coffee thoroughly hulled and cleaned with all the foreign matter separated therefrom.

I have described with particularity the details of construction of the several parts of the machine; but I do not intend to be confined to the exact details of construction, as there may be departures from the exact details without departing from the spirit of the invention. For instance, I have described the lower half of the shell as formed of the perforated metal, but I do not limit myself to the extent or area of the perforated portion. Other changes, however, than the one specifically mentioned may be made without departing from the essentials of the invention, as will be apparent to the skilled in the art.

Having described my invention and set forth its merits, what I claim is—

1. In a coffee huller, the combination with the shell having a tapering portion from its receiving end toward its discharge end and a cylindrical portion at the discharge end thereof, of a revoluble body within said shell having a tapering portion and a cylindrical portion at the end thereof corresponding to the shell and fitting in the corresponding portions of the shell and constituting rubbing surfaces, and heads to opposite ends of said revoluble body and projecting beyond the periphery thereof and bearing against the inside of the shell, substantially as and for the purposes described.

2. In a coffee huller, the combination with the shell having a tapering portion from its receiving end toward its discharge end and a cylindrical portion at the discharge end thereof, and having spirally arranged grooves in its inner surface of the revoluble body within said shell having a tapering portion and a cylindrical portion at the end thereof corresponding to the shell and fitting in the corresponding portions of the shell and provided with longitudinally extending flutes at both ends, the flutes of the cylindrical portion being finer than those at the opposite end of the body, substantially as and for the purposes described.

3. In a coffee huller, the combination with the stationary shell, of the revoluble body located therein provided with external flutes at opposite ends and with an intermediate screen portion, the contiguous surfaces of the shell and body constituting rubbing surfaces for the coffee traveling between the two surfaces, substantially as and for the purposes described.

4. In a coffee huller, the combination with a revoluble body, of a shell inclosing said body and formed on its interior face with spirally arranged grooves, and with grooves extending longitudinally of the shell in the surface thereof and adapted to retard the passage of the coffee in its travel through the shell, substantially as and for the purposes described.

5. In a coffee huller, the combination with a revoluble body, of a shell inclosing said body and formed with a polygonal interior surface having spirally arranged grooves and longitudinally extending grooves in the angles of the polygonal surface, substantially as and for the purposes described.

6. In a coffee huller, the combination with a shell having a longitudinally extending imperforate portion formed with spirally arranged grooves on its interior surface and the opposite longitudinally extending portion formed with perforations adapted to permit the passage of air and fine particles but not grains of coffee, of a revoluble body having a rubbing surface and located within the shell at such distance from the inner surface of the shell as to permit the coffee to traverse the space thus formed without being broken by the rubbing action between the shell and body, and means for controlling the passage of the coffee at the end of the space between the shell screw passing through its hub, as indicated by dotted lines in Fig. 1, or may be held non-rotatably by merely fitting loosely on the shaft and prevented from longitudinal movement by one end of its hub bearing against the sleeve $37^b$ and the other end bearing against a collar $36^a$, held to the shaft by a set-screw, as illustrated in Fig. 1 of the drawings.

The revolving body 34 has a roughened exterior surface from end to end, the same being formed by longitudinally-extending flutes 38 at the receiving end of the machine and with finer flutes 39 at the straight portion of the body at the discharge end of the machine, the intermediate portion being formed either of flutes, as illustrated in Fig. 8 of the drawings, or of wire-cloth, as illustrated in Fig. 5 of the drawings. When the intermediate portion is made of wire net or cloth, I prefer to use what is known as "No. 12" wire-cloth, with about five meshes to the inch, the cloth being preferably of that make which is crimped—that is, having the wires bent where they cross each other—which affords a stiffer and stronger cloth than other makes and the same being well known in the art of making wire-cloth. This wire-cloth will be sustained by the longitudinal staves 40, the staves, however, having a portion cut away, so as to leave openings beneath the wire portion, as illustrated in Fig. 5 of the drawings, a sufficient portion of the staves, however, being left to enable the wire-cloth to be riveted or bolted thereto. Thus cloth will be applied so that its outside face will be practically flush with the outside face of the fluted portion of the revolving body. The fluted portion of the body next to the receiving end is made considerably coarser than the other portion, for the reason that it has the hardest work to perform in breaking the outside hull of the berry, and the flutes at the discharge end are made finer, so as to serve better in cleaning the coffee after the hulls have been broken by the coarser flutes and after the thinner skin or parchment of the berry has been farther removed by the intermediate wire or fluted portion. The intermediate portion serves to scour the coffee after the hulls have been broken by the first flutes. If the wire-cloth is not used for the intermediate portion of the revoluble body, the flutes forming that intermediate portion are preferably made of somewhat greater number than the flutes at the receiving end by forming grooves in the ribs of the fluted portion, as illustrated in Fig. 8 of the drawings, so as to obtain a better scouring action.

The surface of the revolving body is preferably perforated, as illustrated, for the passage of air, and for the same purpose the rings or heads 35 and 36 are perforated or made open. By having the surface and the ends formed with openings air may be drawn through the body and thus keep down the temperature which the friction of hulling and scouring the coffee creates, and which has proved of great detriment in the hulling of coffee in many machines and which therefore is to be guarded against.

After the coffee-berries have been subjected to the action of the revolving body they pass over the end of the revolving body at the top thereof at the discharge end of the machine, as indicated by the arrow in Fig. 1, and into the space between the head or ring 36 of the revolving body and the head of the shell and from thence through the opening 12 into the discharge-spout 41, which communicates at its upper end with a suction or exhaust chamber 31. This exhaust-chamber extends the length of the shell and is under the shell and along the sides thereof, as indicated in Figs. 1 to 4 of the drawings, and is formed by bolting the sheet or other metal 42 to the lower half of the shell, as illustrated in Figs. 2 and 3 of the drawings. This exhaust-chamber is, as previously stated, in communication with the fan 29 through the pipe 30, located under the forward end of the machine, and the suction of the fan serves to draw the hulls, chaff, and all foreign material through the exhaust-chamber and to discharge the same from the fan, while the cleaned coffee is permitted to drop into the discharge-spout 41, from which it is delivered into any suitable receptacle provided for it. This discharge-spout has an inclined bottom 43, which is formed of wire-cloth, so that air may be drawn through the same for the purpose of carrying into the exhaust-chamber any foreign material that may have passed into the spout for the coffee. This discharge-spout is made tapering, as illustrated, so that the air will not be drawn through the discharge-mouth of the spout, but only through the wire bottom, while the coffee will pass unobstructed through the discharge-mouth.

In order to regulate the suction through the exhaust-chamber and the force of the air-current through the discharge-spout, I provide a valve 44, located, preferably, at the juncture of the exhaust-chamber and upper forward end of the discharge-spout and arranged so that by moving said valve across the exhaust-chamber toward the shell the opening into the exhaust-chamber from the spout will be varied, and the suction thus regulated or cut off entirely from the chamber.

In operation the revolving body inside the shell is caused to revolve, the discharge-valve 19 is closed, and the valve to the feed-hopper is gradually opened, so as to let the coffee-berries pass slowly into the huller until the space between the revolving body and the shell is filled, when the discharge-valve is gradually opened until the best results are obtained in the hulling and cleaning of the coffee, which can be determined by examination of the coffee as it passes from the machine through the discharge-spout. When the machine is working, to give the best results the two slides are held at the positions and the revoluble body, substantially as and for the purposes described.

7. In a coffee huller, the combination of a tapering shell having spirally arranged grooves and a longitudinally extending perforated portion, a revoluble tapering rubbing body located therein and having a surface substantially concentric therewith to leave a space between it and the shell for the passage of coffee grains, a spout at the end of the shell to receive the coffee discharged from the shell and formed with an inclined perforated bottom, an exhaust chamber in communication with the interior of the shell through its perforated portion and with the upper portion of said spout whereby air may be drawn through said shell and spout into the exhaust chamber, a valve for controlling the force of the air current therethrough, and means for creating the air current, substantially as and for the purposes described.

8. In a coffee huller, the combination of a shell having a longitudinally extending portion of its body imperforate and formed with spirally arranged grooves and another longitudinally extending portion perforted, in combination with a revoluble body located in said shell to leave a space between the two for the passage of the coffee and having a roughened rubbing surface, an exhaust chamber beneath the perforated portion of the shell, and means for creating an air current through said exhaust chamber, substantially as and for the purposes described.

9. In a coffee huller, the combination of a shell having a longitudinally extending portion of its body imperforate and another longitudinally extending portion perforated, in combination with a revoluble body located in said shell and having a surface substantially concentric therewith to leave a space between the two for the passage of the coffee, a discharge spout at one end of the shell to receive the hulled coffee, an exhaust chamber inclosing the perforated portion of the shell and in communication at one end with said discharge spout, and means for creating an air current in said exhaust chamber for carrying foreign matters from said discharge spout and through said exhaust chamber, substantially as and for the purposes described.

10. The combination with the tapering shell, having a portion of its body perforated, an interior perforated tapering revoluble body, and a valve controlled space at the end of said shell and body, of a spout to receive the hulled coffee from the valve controlled space, and an exhaust chamber beneath the perforated portion of the shell and in communication with the spout receiving the hulled coffee, substantially as and for the purposes described.

In testimony whereof I affix my signature in presence of two witnesses.

CONSTANTINE A. HEGE.

Witnesses:
 H. A. SIDDALL,
 W. T. SPAUGH.